United States Patent [19]
Scott

[11] 3,802,068
[45] Apr. 9, 1974

[54] METHOD OF MAKING A ROTOR
[75] Inventor: Richard K. Scott, Humboldt, Tenn.
[73] Assignee: Gould Inc., Chicago, Ill.
[22] Filed: Apr. 14, 1972
[21] Appl. No.: 244,031

[52] U.S. Cl................. 29/598, 29/205 R, 29/609, 310/42, 310/211, 310/217
[51] Int. Cl. ......................... H02k 15/02
[58] Field of Search......... 29/598, 596, 609, 205 R, 29/203 L; 310/211, 212, 217, 42

[56] References Cited
UNITED STATES PATENTS

| | | | |
|---|---|---|---|
| 3,570,117 | 3/1971 | Kitamura et al. | 29/598 |
| 3,330,031 | 7/1967 | Rediger et al. | 29/598 |
| 2,774,001 | 12/1956 | Riedel | 310/217 |
| 3,559,266 | 2/1971 | Miles | 29/203 L |
| 3,344,514 | 10/1967 | Partlow et al. | 29/598 |

Primary Examiner—Charles W. Lanham
Assistant Examiner—Carl E. Hall
Attorney, Agent, or Firm—Rogers, Ezell & Eilers

[57] ABSTRACT

Laminations for a rotor are equipped with outwardly-projecting tabs; and those laminations are stacked so they are coaxial and so the outwardly-projecting tabs thereof are aligned to provide corresponding alignment of the conductor-receiving passages defined by those laminations. Welds are formed at the outer faces of the outwardly-projecting tabs to bond the laminations together; and then, after conductors have been diecast in the conductor-receiving passages, those outwardly-projecting tabs and the welds on the outer faces thereof are machined away to provide a smooth cylindrical surface for the rotor.

3 Claims, 9 Drawing Figures

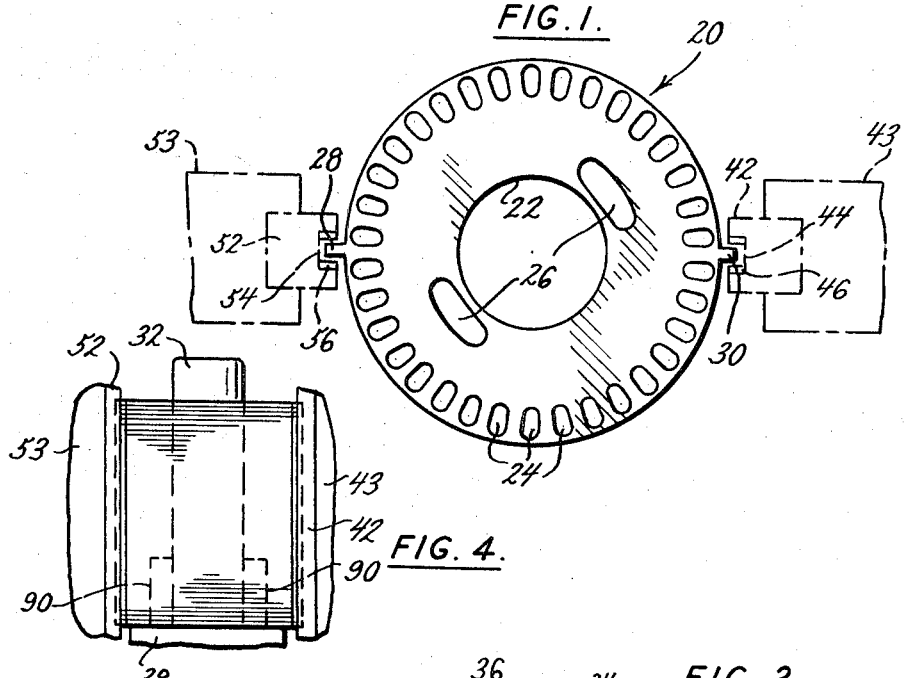
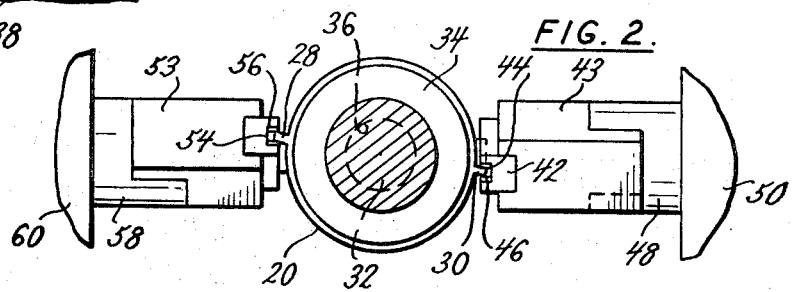
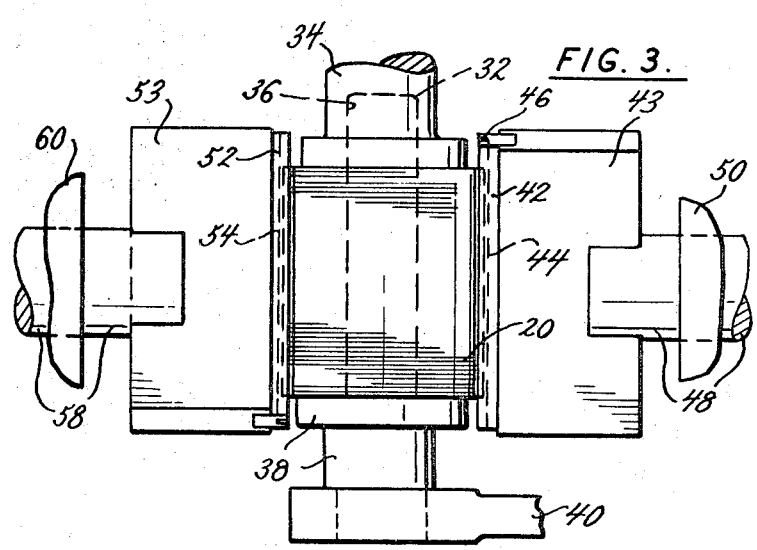

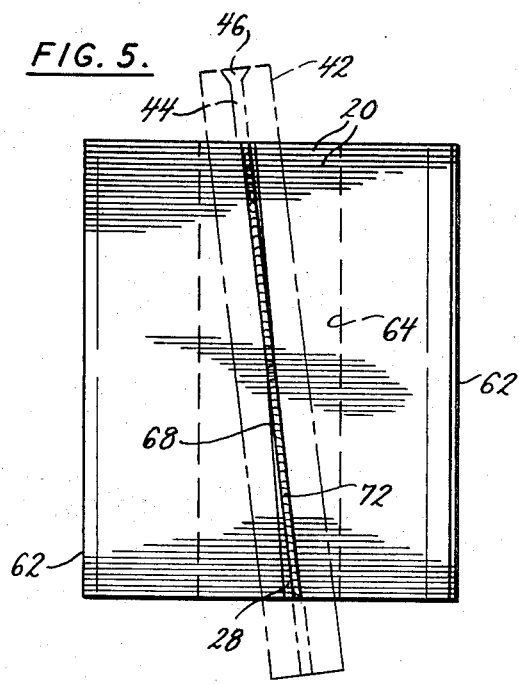
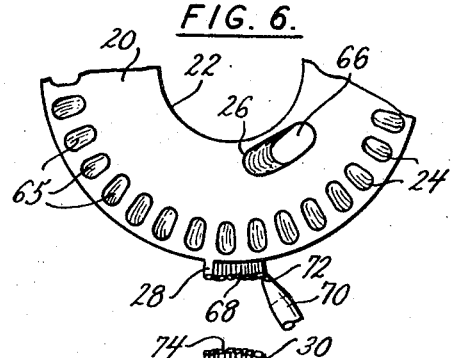
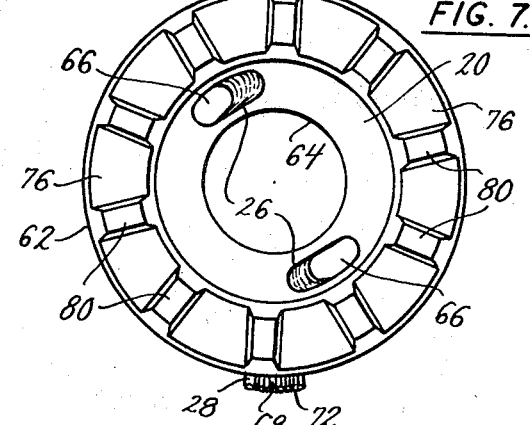
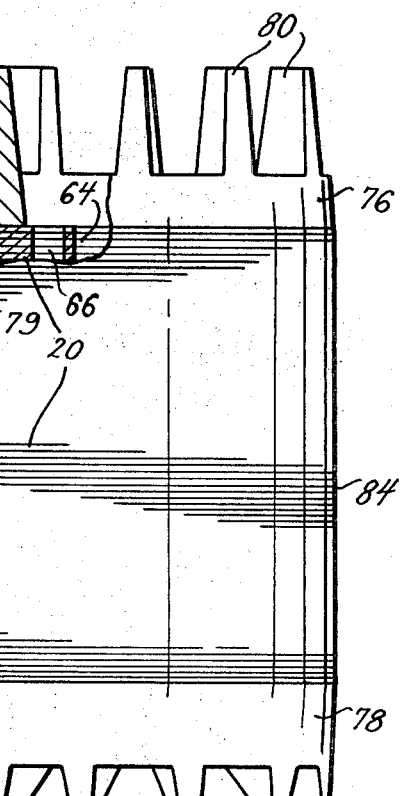
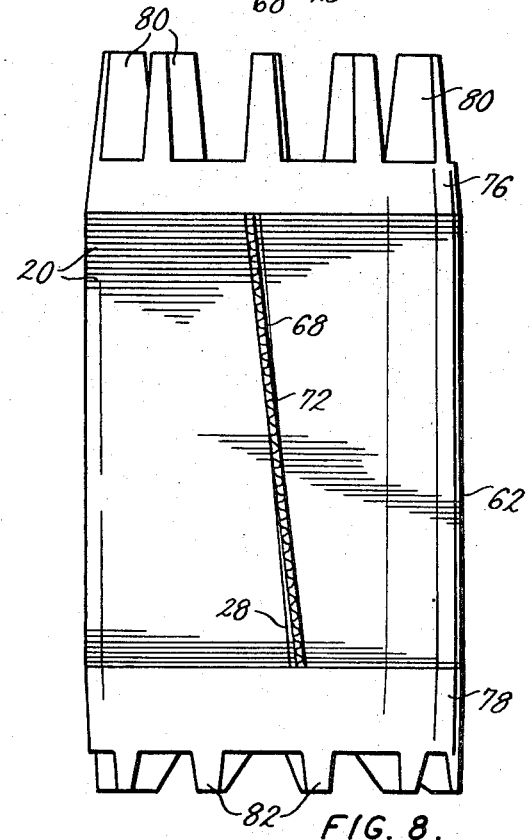

3,802,068

METHOD OF MAKING A ROTOR

This invention relates to improvements in methods of making rotors for dynamoelectric machines. More particularly, this invention relates to improvements in methods of making die-cast rotors for electric motors.

It is, therefore, an object of the present invention to provide an improved method of making diecast rotors for electric motors.

In making diecast rotors for electric motors it is customary to punch laminations which have conductor-receiving openings therein, to assemble those laminations in a stack, and to align those conductor-receiving openings so they define conductor-receiving passages. In some instances the conductor-receiving openings in the laminations are aligned to make the axes of the conductor-receiving passages parallel to the axis of the shaft of the rotor; but in other instances those conductor-receiving openings are aligned to skew the axes of the conductor-receiving passages relative to the axis of that shaft. In some methods of making rotors, the conductor-receiving openings in the laminations are aligned by inserting aligning rods in the conductor-receiving passages or in ventilating passages defined by those laminations. In other methods of making rotors, two of the conductor-receiving passages are defined by slots which extend to the peripheries of the laminations, and aligning blades are fitted into the outer ends of those slots to align the conductor-receiving passages defined by the laminations. The sizes of electric motors have been decreased from time to time — to offset the increased costs of steel and aluminum; and the sizes of motor rotors — and hence the sizes of conductor-receiving openings and of ventilating openings — also have been decreased. As a result, the sizes of aligning rods and the sizes of aligning blades have had to be decreased; and the cross sections of some aligning rods and of some aligning blades have been so small that those aligning rods and aligning blades could flex during the aligning of the conductor-receiving passages in the laminations. Any flexing of the aligning rods or aligning blades would be objectionable; and hence it would be desirable to provide a method of making diecast rotors which did not rely upon aligning rods or aligning blades. The present invention provides such a method; and that method utilizes laminations with outwardly-projecting tabs which can be engaged and aligned by rigid and inflexible aligning guides. As those outwardly-projecting tabs are aligned by the aligning guides, the conductor-receiving openings are automatically and correspondingly aligned to provide the desired alignment for the conductor-receiving passages. Because those aligning guides are rigid and inflexible, they can enforce precise and positive alignment of the outwardly-projecting tabs, and hence of the conductor-receiving passages within the stack of laminations. It is, therefore, an object of the present invention to provide laminations with outwardly-projecting tabs and to provide rigid and inflexible aligning guides to engage and align those outwardly-projecting tabs.

The outwardly-projecting tabs on the laminations have the outer faces thereof welded together to bond those laminations together; and those outwardly-projecting tabs are made long enough to space the welds wholly outwardly of the periphery of the rotor. In doing so, those outwardly-projecting tabs make it possible to machine away all portions of the welds — even if one weld tends to be deeper than intended. By making it possible to machine away all portions of the welds, the outwardly-projecting tabs make it possible to avoid any and all mechanical and electrical unbalance which residual portions of the welds could produce. It is, therefore, an object of the present invention to provide laminations with outwardly-projecting tabs which are made long enough to space the welds at the outer faces thereof wholly outwardly of the periphery of the rotor.

The outwardly-projecting tabs on the laminations are made narrow, and hence they can be welded rapidly and with relatively low amounts of heat. Further, those outwardly-projecting tabs and the welds at the outer faces thereof can be machined away rapidly and with minimal tool wear. It is, therefore, an object of the present invention to provide laminations with outwardly-projecting tabs which are narrow.

Other and further objects and advantages of the present invention should become apparent from an examination of the drawing and accompanying description.

In the drawing and accompanying description a preferred embodiment of the present invention is shown and described but it is to be understood that the drawing and accompanying description are for the purpose of illustration only and do not limit the invention and that the invention will be defined by the appended claims.

BRIEF DESCRIPTION OF THE DRAWING

In the drawing,

FIG. 1 is a plan view of one preferred embodiment of lamination which is made in accordance with the principles and teachings of the present invention, and it shows aligning guides and guide holders by means of dotted lines, FIG. 2 is a plan view, on a smaller scale, of part of a machine for aligning and compressing a plurality of laminations to form a lamination stack, FIG. 3 is an elevational view, approximately on the scale of FIG. 2, of the part of the machine shown in FIG. 2, FIG. 4 is a fragmentary elevational view which is similar to FIG. 3, but which shows a lamination stack for a counter-bored rotor, FIG. 5 is a front elevational view of a lamination stack, and it shows an aligning guide by dotted lines, FIG. 6 is a broken plan view, on the scale of FIG. 1, of part of the lamination stack of FIG. 5, and it shows a welding element adjacent the aligned tabs on that lamination stack, FIG. 7 is a plan view, on the scale of FIG. 1, of the lamination stack of FIGS. 5 and 6 after the end rings, conductors, fan blades and projections have been die cast on that lamination stack, FIG. 8 is a front elevational view of the lamination stack, end rings, fan blades and projections of FIG. 7, and FIG. 9 is a partially broken-away, front elevational view of a finished rotor which includes the lamination stack of FIGS. 5 and 6.

DETAILED DESCRIPTION OF THE PREFERRED EMBODIMENT

Referring to the drawing in detail, the numeral 20 generally denotes a lamination which is made in accordance with the principles and teachings of the present invention. That lamination is a circular disk-like piece of sheet metal, and it has a circular shaft-receiving opening 22 adjacent the center thereof. The numeral 24 denotes a plurality of circumferentially-spaced conductor-receiving openings which are disposed radially-outwardly of the shaft-receiving opening 22; and the numeral 26 denotes two ventilating openings which are disposed adjacent the opposite ends of a diameter of the lamination 20. As shown particularly by FIG. 1, the conductor-receiving openings 24 are generally ovate in configuration, and the ventilating openings 26 also are generally ovate in configuration. The numeral 28 denotes a tab which projects outwardly beyond the circular periphery of the lamination 20, and the numeral 30 denotes a similar tab which projects outwardly beyond that periphery. The tabs 28 and 30 are located at opposite ends of a diameter of the lamination 20, and that diameter is angularly displaced from the various diameters which extend through the ventilating openings 26. As shown particularly by FIG. 1, the tab 28 is in register with the metal which is intermediate two of the conductor-receiving openings 24; and, similarly, the tab 30 is in register with the metal which is intermediate two further of the conductor-receiving openings 24.

One particular lamination that has been made in accordance with the principles and teachings of the present invention has a die-cut diameter of approximately 2 21/32 inches, and has a shaft-receiving opening 22 with a die-cut diameter of approximately 1 inch. The longest radially-directed dimension of any of the conductor-receiving openings 24 is approximately seven thirty-seconds of an inch, and the radially-directed distance between the outermost portion of any of the conductor-receiving openings 24 and the circular periphery of that lamination is less than one thirty-second of an inch. Each of the tabs 28 and 30 is approximately three thirty-seconds of an inch long and approximately one-sixteenth of an inch wide.

The numeral 32 in FIGS. 2-4 denotes an elongated, generally-cylindrical arbor; and that arbor preferably is of the expandible type. The retracted diameter of that arbor will be less than the diameter of the shaft-receiving opening 22; but that arbor can be expanded so it solidly fills that shaft-receiving opening. The numeral 34 denotes a ram of a hydraulic press; and that ram has a cylindrical cavity 36 in the lower end thereof. That cavity is dimensioned so it telescopes downwardly over the upper end of the arbor 32, as indicated by FIG. 3. The ram 34 acts as a clamping member or compression head; and the inner end of the cavity 36 will actuate the expanding mechanism of the expandible arbor 32 as that cavity telescopes downwardly over the upper end of that expandible arbor. The numeral 38 denotes a clamping member or compression head which is held by a support 40; and the expandible arbor 32 is held by, and extends upwardly from, that clamping member.

The numeral 42 denotes a tab-aligning guide which has an elongated, generally-rectangular slot 44 in the inner face thereof; and that tab-aligning guide preferably is made from a hard, wear-resistant metal. The upper end 46 of the slot 44 is tapered, as indicated particularly by FIG. 5. A guide holder 43 has a generally rectangular recess in the inner face thereof; and the aligning guide 42 is pressed into that recess so that guide holder and that aligning guide will move as a unit.

A rotatable arm 48 extends horizontally outwardly from the approximate midpoint of the guide holder 43; and that rotatable arm is held by, but is rotatable relative to, a translatable mounting 50.

The numeral 52 denotes a tab-aligning guide which is a mirror image of the tab-aligning guide 42; and the generally rectangular slot 54 in the inner face of that aligning guide is a mirror image of the slot 44 in the tab-aligning guide 42. The upper end 56 of the slot 54 is tapered, as indicated by FIGS. 1 and 2; and the taper of that upper end can be identical to the taper of the upper end 46 of the slot 44. The numeral 53 denotes a guide holder which is a mirror image of the guide holder 43; and the generally-rectangular recess in the inner face thereof is a mirror image of the generally-rectangular recess in the inner face of the guide holder 43. The aligning guide 52 is pressed into the recess in the inner face of the guide holder 53 so that guide holder and that aligning guide 52 will move as a unit. A rotatable arm 58 extends horizontally outwardly from the approximate midpoint of the guide holder 53; and that rotatable arm is held by, but is rotatable relative to, a translatable mounting 60. The rotatable arms 48 and 58, and hence the aligning guides 42 and 52, can be rotated in the clockwise or counter clockwise directions; and they will usually be rotated in opposite directions.

The tab-aligning guides 42 and 52, the guide holders 43 and 53, the rotatable arms 48 and 58, the translatable mountings 50 and 60, the support 40, the clamping member 38, the ram 34, and the expandible arbor 32 are parts of an aligning and compressing machine. A lamination, identical to the lamination 20, can have the shaft-receiving opening 22 therein telescoped over the upper end of the arbor 32, and can have the outwardly-projecting tabs 28 and 30 thereof aligned, respectively, with the slots 54 and 44 in the inner faces of the aligning guides 52 and 42. That lamination can then be moved downwardly into engagement with the clamping member 38; and that clamping member will underlie and support that lamination. Further laminations, including the lamination 20, can have the shaft-receiving openings 22 therein telescoped over the arbor 32, can have the outwardly-projecting tabs 28 and 30 thereof aligned, respectively, with the slots 54 and 44 in the inner faces of the aligning guides 52 and 42, and can then be moved downwardly into position adjacent that first lamination. Thereafter, the ram 34 can be telescoped down over the upper end of the arbor 32; and then the aligning and compressing machine can be actuated to compress the lamination 20 and the laminations therebelow into a lamination stack which is generally denoted by the numeral 62. Usually the lamination 20 and the other laminations of the lamination stack 62 will be grouped together in the form of a stack before the shaft-receiving openings therein are telescoped downwardly over the expandible arbor 32; and those laminations will usually be telescoped downwardly over that arbor in the form of a stack.

If desired, the outwardly-projecting tabs 28 and 30 and the outwardly-projecting tabs of the other laminations of the lamination stack 62 could be aligned with each other to be parallel to the axis of the expandible arbor 32 — and thus be parallel to the shaft-receiving passage 64 through that lamination stack. However, as shown by FIGS. 5 and 6, that lamination stack will frequently have the outwardly-projecting tabs of the abutting laminations thereof circumferentially displaced relative to each other to cause the aligned outwardly-projecting tabs to be skewed relative to the axis of the shaft-receiving passage 64. As the outwardly-projecting tabs 28 and 30 of the lamination 20 and of the other laminations of the plurality of laminations constituting the lamination stack 62 are displaced circumferentially relative to each other, the conductor-receiving openings 24 of the various laminations of that lamination stack will be circumferentially displaced relative to each other, and the ventilating openings 26 of those various laminations will be circumferentially displaced relative to each other. As a result, the conductor-receiving passages 65 and the ventilating passages 66 in the lamination stack 62 will be skewed relative to the axis of the arbor 32.

Because the rotatable arms 48 and 58 are disposed adjacent the vertical midpoints, respectively, of the guide holders 43 and 53, the lamination or laminations at the vertical midpoint of the laminations stack 62 will not experience any circumferential shift or movement as those guide holders are rotated about the axes of those rotatable arms. Furthr, because those rotatable arms are located adjacent the vertical midpoints of those guide holders, the circumferential shifts or movements of the upper or lower ends of the aligning guides 42 and 52 will be only one-half of the circumferential shifts or movements which the tops of those aligning guides would experience if those rotatable arms were secured to the lower ends of those guide holders.

The aligning and compressing machine of FIGS. 2 and 3 will preferably have the axes of the slots 44 and 54, in the aligning guides 42 and 52, parallel to the axis of the arbor 32 at the time the lamination 20 and the other laminations of the plurality of laminations are inserted into that machine. The tapered upper ends 46 and 56 of the slots 44 and 54, respectively, in those aligning guides will facilitate the insertion of the outwardly-projecting tabs 30 and 28 on the various laminations into those slots. As those outwardly-projecting tabs move downwardly below the tapered upper ends 46 and 56 of the slots 44 and 54, respectively, the side walls of those slots will automatically align those outwardly-projecting tabs, and thus also will automatically align the conductor-receiving openings 24 in the various laminations of the plurality of laminations. After all of the laminations of the plurality of laminations have had the outwardly-projecting tabs 30 and 28 thereof disposed within the slots 44 and 54 in the aligning guides 42 and 52, respectively, the rotatable arms 48 and 58 can be rotated to provide the desired amount of skew.

The rotations of the rotatable arms 48 and 58, and hence of the guide holders 43 and 53 and of the aligning guides 42 and 52, will be in opposite directions, as indicated particularly by FIGS. 2 and 3. As the aligning guides 42 and 52 are rotated by the counter-current rotation of the rotatable arms 48 and 58 and of the guide holders 43 and 53, the laminations which are disposed above and below the centermost lamination or laminations of the lamination stack 62 will shift or move circumferentially relative to each other. The greater the axial distance between a given lamination and the centermost lamination or laminations, the greater will be the extent of the circumferential shift or movement of that lamination. The outwardly-projecting tabs 28 and 30 on the various laminations will respond to the circumferential shifts or movements of the various laminations to define a group of aligned tabs 68 of helical configuration at one side of the lamination stack and to form a similar group of aligned tabs at the opposite side of that lamination stack. The outer faces of the outwardly-projecting tabs 28 and 30 on the laminations which are adjacent the upper ends and the lower ends of the lamination stack 62 will, as those laminations are shifted or moved circumferentially, move inwardly and away from the vertically-directed planes which are defined by the inner faces of the aligning guides 52 and 42. However, the radial dimensions of the outwardly-projecting tabs 28 and 30 on the various laminations are long enough to enable the outer faces of all of the laminations — even including the outer faces of the uppermost and lowermost laminations — to remain within the confronting slots 54 and 44 of the aligning guides 52 and 42, as indicated particularly by FIG. 2. Preferably the radial dimensions of the outwardly-projecting tabs 28 and 30 of the laminations of the plurality of laminations are long enough to permit any desired angle of skew, within the range from zero to thirty degrees, to be provided.

The aligning guides 42 and 52 are rigid and unyielding in nature, and hence they will force the outwardly-projecting tabs 28 and 30 to assume the exact and precise alignment that is desired. Further, because those aligning guides are rigid and unyielding in nature, their inclinations will correspond exactly to the inclinations of the aligned tabs 68 and of the aligned tabs at the opposite side of the lamination stack 62. Consequently, those aligning guides provide an accurate, readily-ascertainable visual check of the extent to which the conductor-receiving passages 66 have been skewed.

At this time, the ram 35 will be telescoped downwardly over the upper end of the arbor 32; and the press, of which that ram is a part, will be caused to exert a downwardly-directed force on that ram, and hence on all of the laminations in the lamination stack 62. In one preferred method of the present invention, that force is the maximum force which is exertible by a fifty ton hydraulic press. The resulting pressure on the lamination stack 62 is comparable to the pressure which will be exerted on that lamination stack by the die casting machine which will be used to diecast the end rings 76 and 78, the fan blades 80, the projections 82 and the conductors 79 of the diecast rotor.

The pressure, which is applied to the lamination stack 62 by the ram 34 and the clamping member 38, is then reduced slightly; but the reduced pressure is high enough to hold the confronting faces of the various laminations of that lamination stack in intimate relation. The aligning guides 52 and 42 are then moved laterally outwardly to separate them from the aligned tabs 68 and from the aligned tabs at the opposite side of the lamination stack 62; and, thereafter, a welding element 70 is moved into register with, and is moved along the length of, the aligned tabs 68. Simultaneously with the movement of the welding element 70 along the aligned tabs 68, a second welding element, not shown, will be moved along the aligned tabs at the opposite side of the lamination stack 62. Those welding elements can be the consumable rods of a metal-inert-gas welding process or can be the tungsten rods of a tungsten-inert-gas welding process. In either event, those welding elements will form a continuous elongated weld 72 at the outer faces of the aligned tabs 68, and will form a continuous weld 74 at the outer faces of the aligned tabs at the opposite side of the lamination stack 62.

The radial dimensions of the outwardly-projecting tabs 28 and 30 on each of the laminations of the lamination stack 62 are long enough to make certain that no portion of either of the continuous elongated welds 72 and 74 can reach or extend inwardly of the cylindrical surface which is defined by the circular peripheries of those laminations. Moreover, the circumferential dimensions of the outwardly-projecting tabs 28 and 30 of the laminations of the lamination stack 62 are small enough to minimize the total amount of heat which must be used in forming the continuous elongated welds 72 and 74. In fact, considerably less heat is required to form the continuous elongated welds 72 and 74 than is required in rotor-welding methods wherein continuous elongated welds are formed on, and penetrate into, the surfaces of the lamination stacks. Specifically, it is possible to form continuous elongated welds 72 and 74 which are in the range of fifteen to thirty thousandths of an inch deep with just eighteen amperes of welding current, whereas it would require about one hundred and fifty amperes of welding current to form continuous elongated welds of comparable depth in the surface of a lamination stack. Moreover, because the continuous elongated welds 72 and 74 are spaced wholly outwardly of the periphery of the lamination stack 62, by the outwardly-projecting tabs 28 and 30 of the various laminations, no part of that periphery can experience any heat-degradation.

At the conclusion of the welding step, the welded lamination stack 62 is telescoped upwardly off of the arbor 32, and then it is positioned within a diecasting machine, not shown. That diecasting machine can be of standard and usual form and design, and it is not a part of the present invention. In that diecasting machine, the end rings 76 and 78, the fan blades 80, the projections 82 and the conductors 79 will be formed. Those end rings, fan blades, projections and conductors are of standard and usual form and design, and they are not parts of the present invention.

At the conclusion of the diecasting operation, the die cast rotor will be removed from the diecasting machine and will be positioned within a suitable lathe. That lathe will be used to remove the continuous elongated welds 72 and 74 and the aligned tabs on which those continuous elongated welds were formed. Because those aligned tabs are narrow, they will present only a minimal resistance to the cutting tool of the lathe; and hence the turning operation can proceed rapidly. Further, the amount of wear which that cutting tool will experience as it removes those continuous elongated welds and those aligned tabs will be minimal. After the continuous elongated welds 72 and 74 have been removed, and after the aligned tabs have been removed, the cutting tool will be moved further inwardly to form a precisely-concentric, smooth-surfaced diecast rotor 84.

Because no part of either of the continuous elongated welds 72 and 74 is at, or extends inwardly of, the surface of the lamination stack 62, no part of that surface need be removed for the purpose of removing those continuous elongated welds. Consequently, considerably less of the surface of that lamination stack need be removed than if those continuous elongated welds had been formed in that surface. Specifically, by using the outwardly-projecting tabs 28 and 30 to displace the continuous elongated welds 72 and 74 wholly outwardly of the surface of the lamination stack 62, the present invention makes it possible to machine away as little as seventeen-thousandths of an inch of that surface and yet form a precisely-concentric, smooth-surface diecast rotor 84 which has no residuum of either of those continuous elongated welds. In contrast, if continuous elongated welds are formed in the surface of the lamination stack 62 with depths ranging from fifteen to thirty thousandths of an inch, it would be advisable to machine away about thirty-five thousandths of an inch of that surface to form a precisely-concentric, smooth-surfaced diecast rotor which had no residuum of either of those continuous elongated welds.

Where the initial diameter of the lamination 20 is between 2 649/1,000 of an inch and 2 651/1,000 of an inch, and where the diameter of the precisely-concentric, smooth-surface diecast rotor 84 is between 2 615/1,000 of an inch and 2 617/1,000 of an inch — as where the continuous elongated welds 72 and 74 are wholly displaced outwardly of the periphery of the lamination stack 62 by the outwardly-projecting tabs 28 and 30 — the machining step need only remove slightly more than fourteen hundredths of a square inch of the area of each lamination. However, where the initial diameter of the lamination 20 is the same but the diameter of the precisely-concentric, smooth-surfaced diecast rotor is between 2 579/1,000 of an inch and 2 581/1,000 of an inch — as where continuous elongated welds having depths in the range of fifteen to thirty thousandths of an inch were formed in the surface of the lamination stack — the machining step must remove more than twenty-eight hundredths of a square inch of the area of each lamination. This means that by using the lamination 20 of the present invention, it is possible to cut the amount of machining in half — with important decreases in machining time and in wearing of the cutting tools.

It thus should be apparent that the lamination provided by the present invention makes it possible to form a diecast rotor which has a continuous, uninterrupted and homogeneous periphery for each of the laminations thereof, and which has the outer faces of the endmost laminations thereof parallel to each other and perpendicular to the axis of the shaft-receiving passage therein. Further, it should be apparent that the said lamination makes it possible to form a diecast rotor which is wholly devoid of any residuum of either of the continuous elongated welds 72 and 74. Moreover, it should be apparent that the lamination of thhe present invention minimizes the amount of welding current which is needed to form those continuous elongated welds, and that it minimizes the amount of machining which must be performed on the diecast rotor.

The lamination stack in FIG. 4 will be incorporated into a counter-bored diecast rotor; and the lower laminations of that lamination stack will have centrally-located openings therein which are larger than the shaft-receiving opening 22 in the lamination 20. Those centrally-located openings will telescope over, and will be aligned by, an annular space 90, which will be telescoped over the expandible arbor 32 whenever a lamination stack for a counter-bored rotor is to be fabricated. The lower end of that annular spacer will rest upon the upper surface of the compression member 38;

and the height of that annular spacer will just equal the axial dimension of the counter-bore for the counter-bored rotor. As a result, the laminations in FIG. 4 which are disposed above the level of the upper end of that annular spacer will have shaft-receiving openings which will be snugly engaged by the expandible arbor 32.

Each of the various laminations of the lamination stack in FIG. 4 will have outwardly-projecting tabs 28 and 30; and those outwardly-projecting tabs will extend into, and will be guided and aligned by, the aligning guides 42 and 52. The aligning, compressing and welding of the various laminations of that lamination stack will be accomplished in the same manner in which the aligning, compressing and welding of the various laminations of the lamination stack 62 of FIGS. 5 and 6 is accomplished. Similarly, the machining of the lamination stack of FIG. 4 will be accomplished in the same manner in which the machining of the lamination stack 62 of FIGS. 5 and 6 is accomplished.

Although the lamination 20 is shown with two ventilating openings 26, that lamination could be made without any ventilating openings. Alternatively, that lamination could be made with three or more ventilating openings. The outwardly-projecting tabs 28 and 30 are shown at opposite ends of a diameter of the lamination 20; and, where that lamination has an even number of conductor-receiving openings 26, those outwardly-projecting tabs will preferably be disposed at opposite ends of a diameter of that lamination. However, where that lamination has an odd number of conductor-receiving openings 26, the outwardly-projecting tabs 28 and 30 will be close to, but will not lie on, the same diameter.

The diecast rotor, which includes the lamination stack 62, of FIGS. 5 and 6, can have end ring configurations of different sizes and forms. For example that diecast rotor can have end rings at both ends which are equipped with fan blades. However, it should be understood that the end rings and the configurations thereof are not parts of the present invention.

Whereas the drawing and accompanying description have shown and described a preferred embodiment of the present invention, it should be apparent to those skilled in the art that various changes may be made in the form of the invention without affecting the scope thereof.

What I claim is:

1. A method of making a lamination stack for use in making a die-cast rotor which comprises forming a plurality of laminations each of which has a centrally-located opening and a generally-circular periphery and a tab projecting outwardly beyond said generally-circular periphery and a plurality of circumferentially-spaced openings intermediate said centrally-located opening and said generally-circular periphery, telescoping said centrally-located openings of said plurality of laminations over an arbor, engaging said outwardly-projecting tabs of said plurality of laminations with an aligning guide to align said outwardly-projecting tabs of said plurality of laminations with each other, applying axially-directed forces, to the outer faces of the endmost laminations of said plurality of laminations to urge the confronting faces of said plurality of laminations into intimate engagement with each other and thereby form said lamination stack, moving a welding element along the aligned outwardly-projecting tabs of said plurality of laminations in said lamination stack to weld together the outer faces of said aligned outwardly-projecting tabs of said plurality of laminations in said lamination stack and thereby form a substantially-continuous weld, along said outer faces of said aligned outwardly-projecting tabs of said plurality of laminations in said lamination stack, and keeping the heat developed by said welding element low enough to keep all portions of said substantially-continuous weld outwardly of the cylindrical surface defined by the periphery of said lamination stack.

2. A method of making a lamination stack for use in making a die-cast rotor which comprises forming a plurality of laminations each of which has a centrally-located opening and a generally-circular periphery and a tab projecting outwardly beyond said generally-circular periphery and a plurality of circumferentially-spaced openings intermediate said centrally-located opening and said generally-circular periphery, telescoping said centrally-located openings of said plurality of laminations over an arbor, engaging said outwardly-projecting tabs of said plurality of laminations with an aligning guide to align said outwardly-projecting tabs of said plurality of laminations with each other, applying axially-directed forces, to the outer faces of the endmost laminations of said plurality of laminations to urge the confronting faces of said plurality of laminations into intimate engagement with each other and thereby form said lamination stack, moving a welding element along the aligned outwardly-projecting tabs of said plurality of laminations in said lamination stack to weld together the outer faces of said aligned outwardly-projecting tabs of said plurality of laminations in said lamination stack and thereby form a substantially-continuous weld along said outer faces of said aligned outwardly-projecting tabs of said plurality of laminations in said lamination stack, and subsequently removing said aligned outwardly-projecting tabs of said plurality of laminations in said lamination stack and said substantially-continuous weld to make the periphery of said lamination stack completely cylindrical.

3. A method of making a lamination stack for use in making a die-cast rotor which comprises forming a plurality of laminations each of which has a centrally-located opening and a generally-circular periphery and a tab projecting outwardly beyond said generally-circular periphery and a plurality of circumferentially-spaced openings intermediate said centrally-located opening and said generally-circular periphery, telescoping said centrally-located openings of said plurality of laminations over an arbor, engaging said outwardly-projecting tabs of said plurality of laminations with an aligning guide to align said outwardly-projecting tabs of said plurality of laminations with each other, applying axially-directed forces, to the outer faces of the endmost laminations of said plurality of laminations to urge the confronting faces of said plurality of laminations into intimate engagement with each other and thereby form said lamination stack, moving a welding element along the aligned outwardly-projecting tabs of said plurality of laminations in said lamination stack to weld together the outer faces of said aligned outwardly-projecting tabs of said plurality of laminations in said lamination stack and thereby form a substantially-continuous weld along said outer faces of said aligned outwardly-projecting tabs of said plurality of laminations in said lamination stack, keeping the heat developed by said welding element low enough to keep all portions of said substantially-continuous weld outwardly of the cylindrical surface defined by the periphery of said lamination stack, and subsequently removing said aligned outwardly-projecting tabs of said plurality of laminations in said lamination stack and said substantially-continuous weld to make the periphery of said lamination stack completely cylindrical.

* * * * *